US011858795B2

(12) United States Patent
Tracy et al.

(10) Patent No.: US 11,858,795 B2
(45) Date of Patent: Jan. 2, 2024

(54) PALLET DETECTION SYSTEMS AND METHODS FOR A MATERIAL HANDLING VEHICLE

(71) Applicant: The Raymond Corporation, Greene, NY (US)

(72) Inventors: Erik C. Tracy, Johnson City, NY (US); Timothy A. Schoelier, Endicott, NY (US); Thomas W. Confer, Chenango Forks, NY (US); Kevin T. Bordwell, Binghamton, NY (US)

(73) Assignee: The Raymond Corporation, Greene, NY (US)

( * ) Notice: Subject to any disclaimer, the term of this patent is extended or adjusted under 35 U.S.C. 154(b) by 0 days.

(21) Appl. No.: 18/084,205

(22) Filed: Dec. 19, 2022

(65) Prior Publication Data

US 2023/0124186 A1 Apr. 20, 2023

Related U.S. Application Data

(63) Continuation of application No. 16/840,883, filed on Apr. 6, 2020, now Pat. No. 11,530,121.

(60) Provisional application No. 62/830,110, filed on Apr. 5, 2019.

(51) Int. Cl.
*B66F 9/075* (2006.01)
*B66F 9/07* (2006.01)

(52) U.S. Cl.
CPC ........ *B66F 9/0755* (2013.01); *B66F 9/07504* (2013.01); *B66F 9/07* (2013.01)

(58) Field of Classification Search
CPC ..................................................... B66F 9/0755
See application file for complete search history.

(56) References Cited

U.S. PATENT DOCUMENTS

| | | | | |
|---|---|---|---|---|
| 4,212,375 A * | 7/1980 | Peterson | B66F 9/0755 | 187/224 |
| 4,266,106 A * | 5/1981 | Fraser | H01H 3/16 | 200/61.44 |
| 4,751,983 A * | 6/1988 | Leskovec | B66F 9/0755 | 356/400 |
| 9,932,213 B2 * | 4/2018 | Buchmann | B66F 9/146 | |
| 10,048,398 B2 * | 8/2018 | Rose | G01V 3/02 | |
| 11,274,021 B2 * | 3/2022 | Standard | B66F 9/0755 | |
| 2003/0235489 A1 * | 12/2003 | Hoff | B62B 3/0618 | 414/607 |

FOREIGN PATENT DOCUMENTS

| | | | |
|---|---|---|---|
| FR | 2677006 A1 * | 12/1992 | B66F 9/0755 |
| JP | H0494399 * | 3/1992 | B66F 9/24 |

* cited by examiner

*Primary Examiner* — Mark C Hageman
(74) *Attorney, Agent, or Firm* — Quarles & Brady LLP

(57) ABSTRACT

A pallet detection assembly for a material handling vehicle is provided. The pallet detection assembly includes a body defining a cavity and having a proximity sensor housed at least partially within the cavity. The pallet detection assembly further includes an actuation plate having a tab coupled thereto and extending in a direction toward the body, and an actuator having a cylinder coupled to the body and a plunger slidably received within the cylinder and coupled to the actuation plate. The actuator is configured to movably couple the actuation plate to the body so that the actuation plate is configured to non-pivotally displace relative to the body.

20 Claims, 20 Drawing Sheets

| Signals | | Indication |
|---|---|---|
| Sensor 1 | Sensor 1 | |
| 0 | 0 | no pallet loaded |
| 1 | 0 | pallet askew |
| 0 | 1 | pallet askew |
| 1 | 1 | pallet properly loaded |

FIG. 14

| Signals | | | | Output Message |
|---|---|---|---|---|
| First Detection Assembly | | Second Detection Assembly | | |
| Sensor 2 | Sensor 1 | Sensor 2 | Sensor 1 | |
| 0 | 0 | 0 | 0 | no pallet loaded |
| 1 | 0 | 0 | 0 | pallet askew |
| 0 | 0 | 1 | 0 | pallet askew |
| 1 | 0 | 1 | 0 | pallet aligned, not fully loaded |
| 0 | 0 | 1 | 1 | pallet askew |
| 1 | 1 | 0 | 0 | pallet askew |
| 1 | 1 | 1 | 0 | palled loaded and askew |
| 1 | 0 | 1 | 1 | pallet loaded and askew |
| 1 | 1 | 1 | 1 | pallet properly loaded |

FIG. 15

PALLET DETECTION SYSTEMS AND METHODS FOR A MATERIAL HANDLING VEHICLE

CROSS-REFERENCES TO RELATED APPLICATIONS

The present application is a continuation of U.S. patent application Ser. No. 16/840,883, filed Apr. 6, 2020, and entitled "Pallet Detection System and Methods for a Material Handling Vehicle", which is based on and claims priority to U.S. Provisional Application No. 62/830,110, filed Apr. 5, 2019, and entitled "Pallet Detection Systems and Related Methods."

STATEMENT REGARDING FEDERALLY SPONSORED RESEARCH

Not Applicable.

BACKGROUND

Material handling vehicles have been developed to transport goods loaded onto generally standardized transport platforms (e.g., pallets). Pallets generally can include vertical supports (e.g., stringers) connected to a support platform. The pallet and loaded goods may be lifted and transported with forks on the material handling vehicle.

BRIEF SUMMARY

The present disclosure relates generally to load detection systems and, more specifically, to a pallet detection assembly for a material handling vehicle.

In one aspect, the present disclosure provides a pallet detection assembly for a material handling vehicle. The pallet detection assembly includes a body defining a cavity and having a proximity sensor housed at least partially within the cavity. The pallet detection assembly further includes an actuation plate having a tab coupled thereto and extending in a direction toward the body, and an actuator having a cylinder coupled to the body and a plunger slidably received within the cylinder and coupled to the actuation plate. The actuator is configured to movably couple the actuation plate to the body so that the actuation plate is configured to non-pivotally displace relative to the body.

In one aspect, the present disclosure provides pallet detection assembly for a material handling vehicle. The pallet detection assembly includes a body defining a cavity and having a proximity sensor housed at least partially within the cavity. The proximity sensor includes a sensor surface. The pallet detection assembly further includes an actuation plate having a tab coupled thereto and extending in a direction toward the body, and an actuator including a cylinder coupled to the body and a plunger slidably received within the cylinder and coupled to the actuation plate. The actuation plate is configured to non-pivotally displace relative to the body to transition the proximity sensor between an unblocked state where the sensor surface is unblocked by the tab and a blocked position where the sensor surface is at least partially blocked by the tab.

In one aspect, the present disclosure provides material handling vehicle including a fork carriage having a first fork and a second fork laterally separated from the first fork, a first pallet detection assembly arranged adjacent to a laterally-outer edge of the first fork, and a second pallet detection assembly arranged adjacent to a laterally-outer of the second fork. The first pallet detection assembly includes a first body defining a first cavity and having a first proximity sensor housed at least partially within the first cavity, a first actuation plate having a first tab coupled thereto and extending in a direction toward the first body, a first actuator including a first cylinder coupled to the first body and a first plunger slidably received within the first cylinder and coupled to the first actuation plate. The first actuator is configured to movably couple the first actuation plate to the first body so that the first actuation plate is configured to non-pivotally displace relative to the first body. The second pallet detection assembly includes a second body defining a second cavity and having a second proximity sensor housed at least partially within the second cavity, a second actuation plate including a second tab coupled thereto and extending in a direction toward the second body, and a second actuator including a second cylinder coupled to the second body and a second plunger slidably received within the second cylinder and coupled to the second actuation plate. The second actuator is configured to movably couple the second actuation plate to the second body so that the second actuation plate is configured to non-pivotally displace relative to the second body.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

FIG. 14 is an example output table for the pallet detection assembly of FIG. 1 when installed on a material handling vehicle.

FIG. 15 is an example output table for the pallet detection assembly of FIG. 7 when installed on a material handling vehicle.

DETAILED DESCRIPTION

Figure 1:
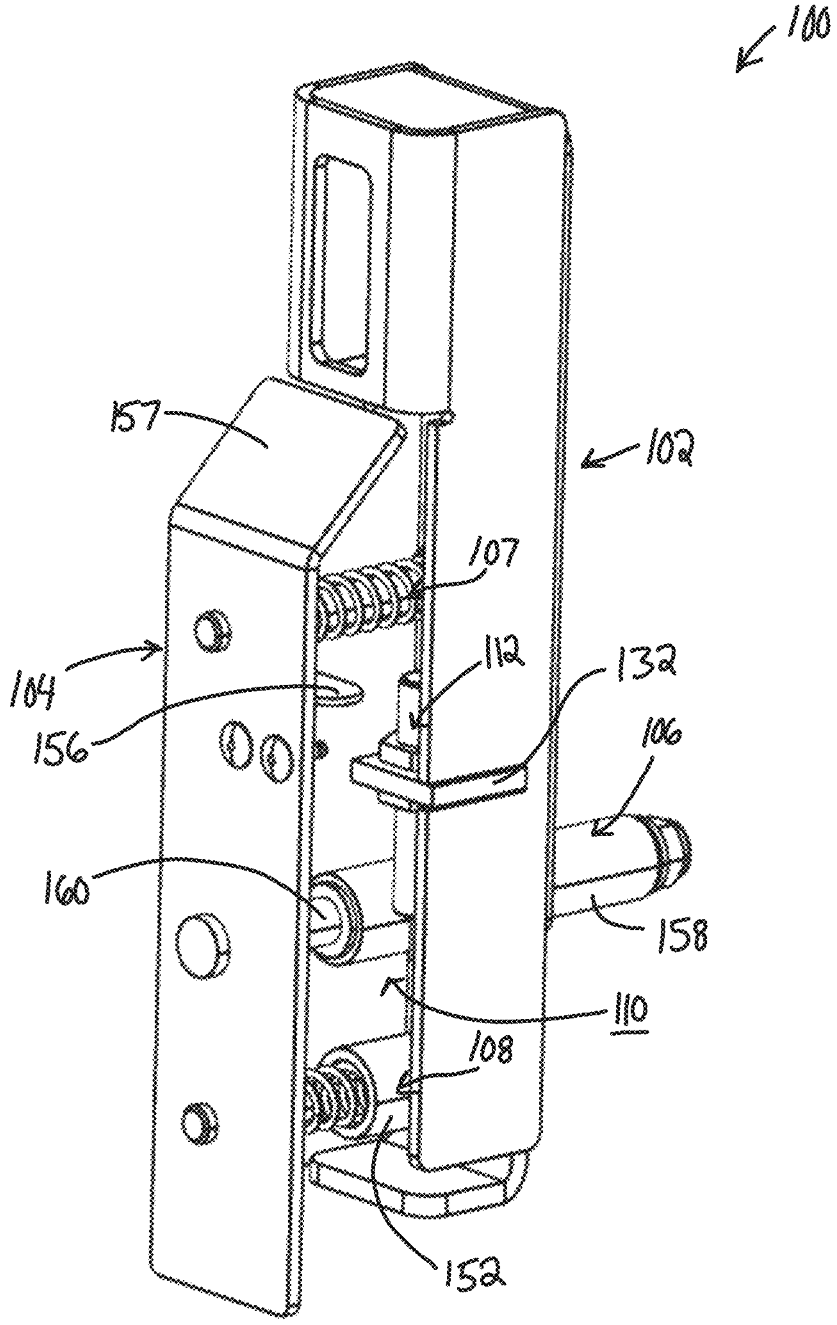
FIG. 1 is a top, front, left isometric view of a pallet detection assembly according to aspects of the present disclosure.

Before any aspect of the present disclosure are explained in detail, it is to be understood that the present disclosure is not limited in its application to the details of construction and the arrangement of components set forth in the following description or illustrated in the following drawings. The present disclosure is capable of other configurations and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use aspects of the present disclosure. Various modifications to the illustrated configurations will be readily apparent to those skilled in the art, and the generic principles herein can be applied to other configurations and applications without departing from aspects of the present disclosure. Thus, aspects of the present disclosure are not intended to be limited to configurations shown but are to be accorded the widest scope consistent with the principles and features disclosed herein. The following detailed description is to be read with reference to the figures, in which like elements in different figures have like reference numerals. The figures, which are not necessarily to scale, depict selected configurations and are not intended to limit the scope of the present disclosure. Skilled artisans will recognize the non-limiting examples provided herein have many useful alternatives and fall within the scope of the present disclosure.

It is also to be appreciated that material handling vehicles are designed in a variety of configurations to perform a variety of tasks. It will be apparent to those of skill in the art that the present disclosure is not limited to any specific material handling vehicle and can also be provided with various other types of vehicle configurations, including for example, order pickers, SWING-REACH®, and any other lift vehicles. The various systems and methods disclosed herein are suitable for any of driver controlled, pedestrian controlled, remotely controlled, and autonomously controlled material handling vehicles.

As described herein, the present disclosure provides one or more pallet detection assemblies that may be configured to sense pallet loading on a material handling vehicle (MHV). In general, the pallet detection assemblies may include an actuation plate that is selectively movable relative to a body within which a proximity senor is housed. The actuation plate may be configured to move or displace non-pivotally relative to the body. That is, each point along the load detection plate moves in unison and travel the same amount of distance relative to the body.

Figure 2:
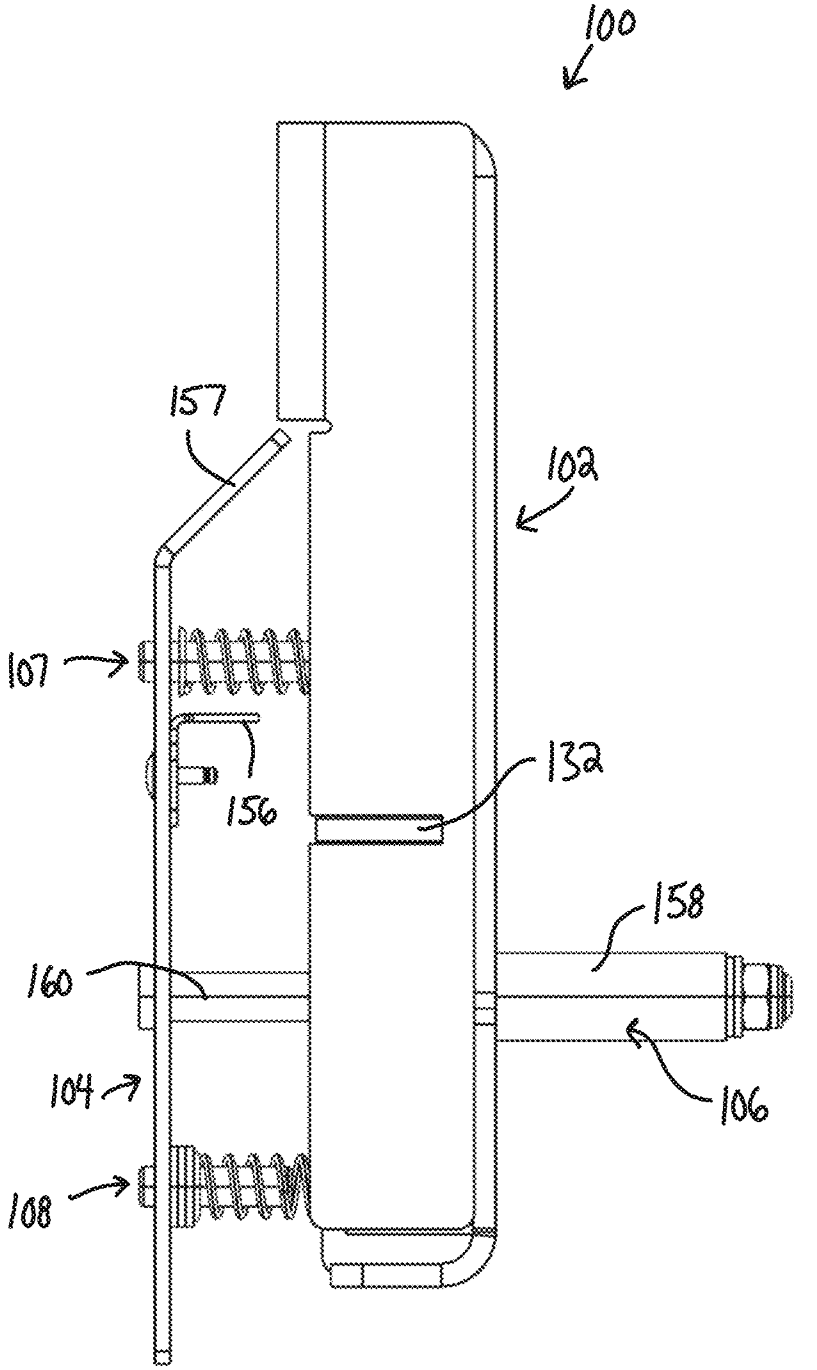
FIG. 2 is a left side view of the pallet detection assembly of FIG. 1.
Figure 3:
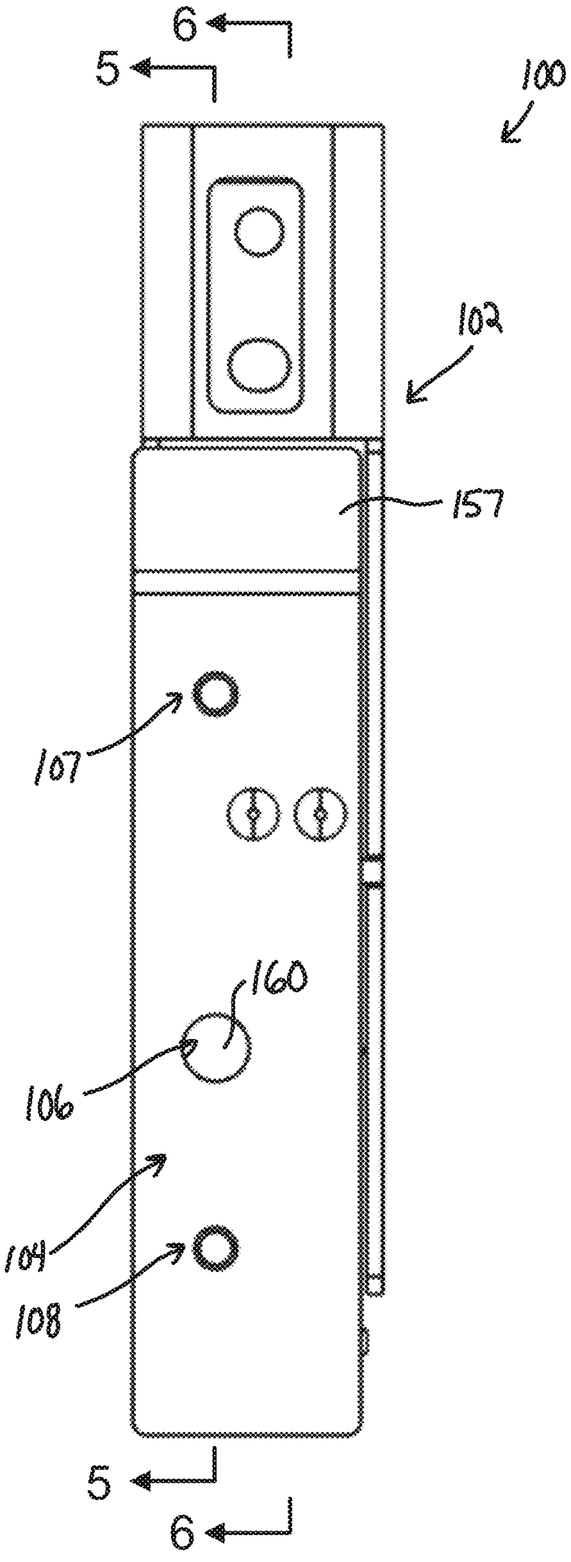
FIG. 3 is a front view of the pallet detection assembly of FIG. 1.
Figure 4:
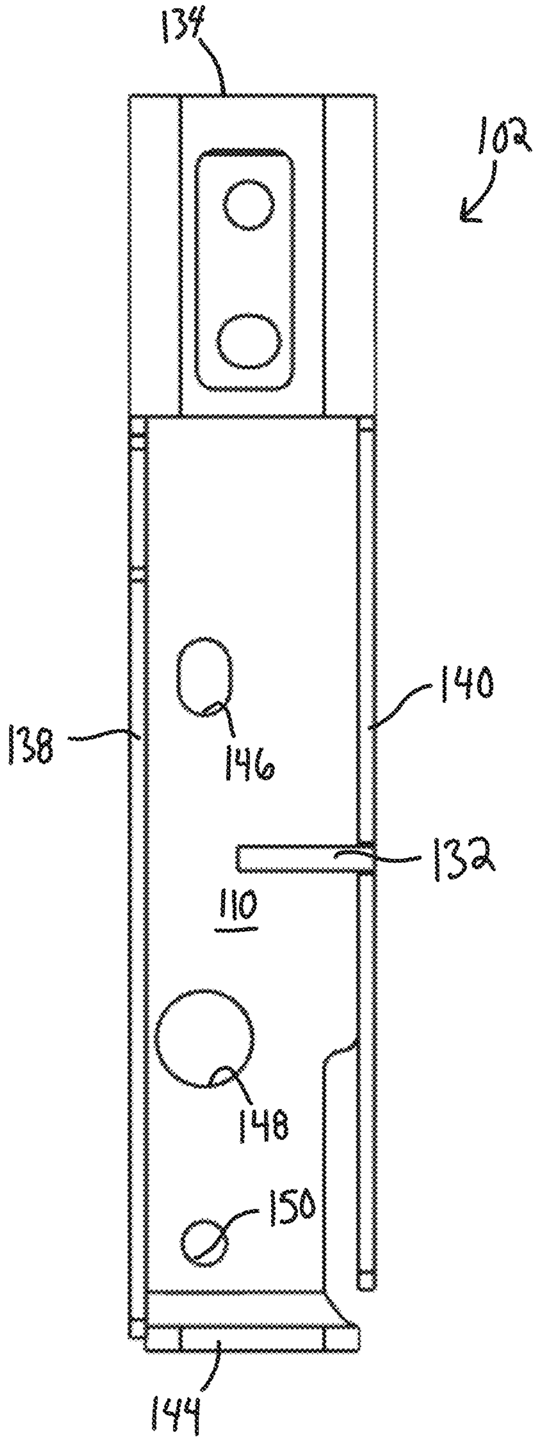
FIG. 4 is a front view of a body of the pallet detection assembly of FIG. 1.
Figure 5:
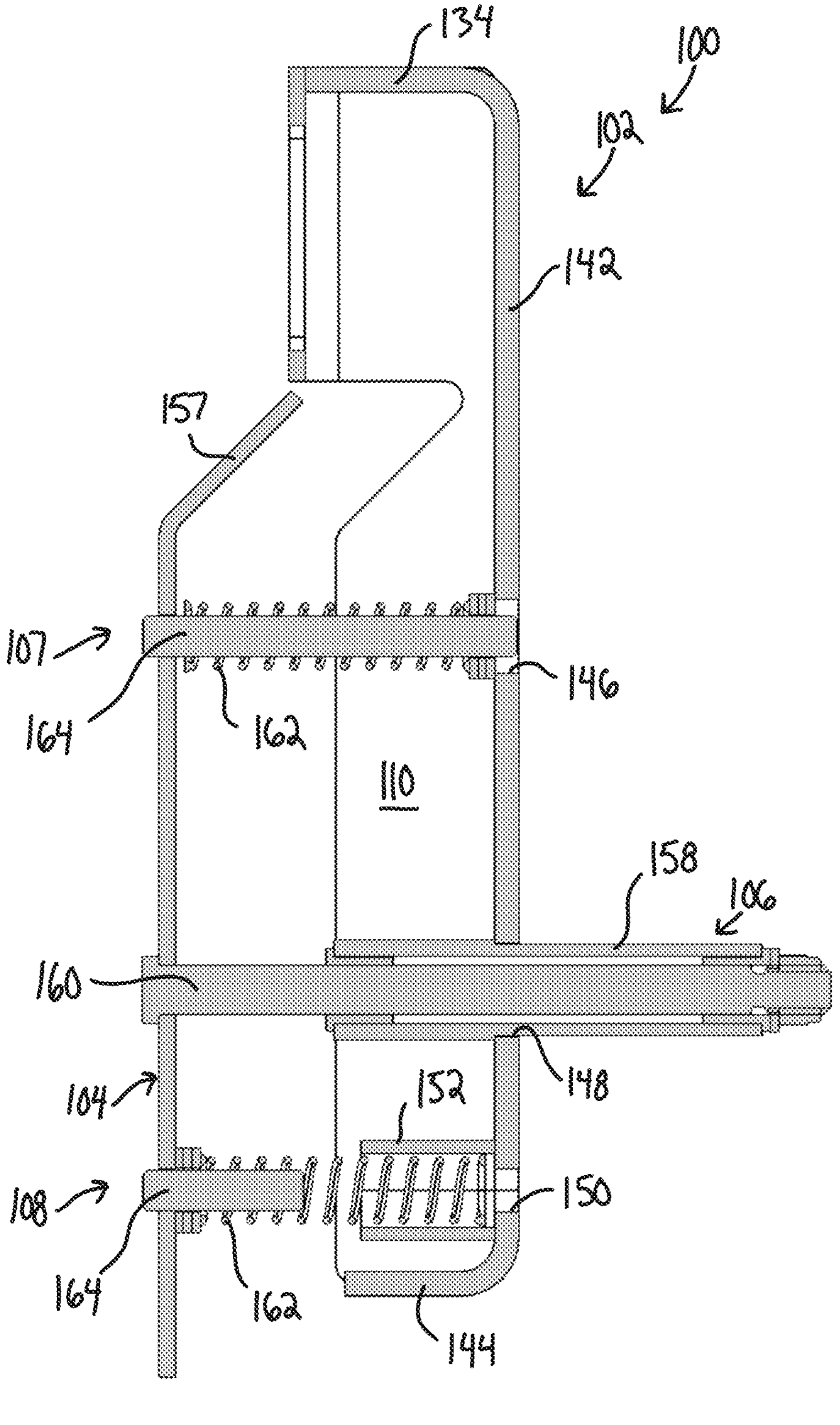
FIG. 5 is a cross-sectional view of the pallet detection assembly of FIG. 3 taken along line 5-5.

With reference to FIGS. 1-3, a pallet detection assembly 100 is shown in accordance with one aspect of the present disclosure. The pallet detection assembly 100 may include a body 102, an actuation plate 104, an actuator 106, a first spring assembly 107, and a second spring assembly 108. In general, the actuator 106 may movably couple the actuation plate 104 to the body 102, so that the actuation plate 104 may displace non-pivotally relative to the body 102 against a biasing force of the first spring assembly 107 and the second spring assembly 108.

With specific reference to FIGS. 3-6, the body 102 may define a cavity 110 within which a proximity sensor 112 may be at least partially housed. The body 102 may include a sensor mounting bracket 132, a top wall 134, a first side wall 138, a second side wall 140, a rear wall 142, and a bottom wall 144. In general, the top wall 134, the first side wall 138, the second side wall 140, the rear wall 142, and the bottom wall 144 may be coupled to one another or formed as a unitary component to define the cavity 110. The rear wall 142 may define a first opening 146, a second opening 148, a third opening 150, with the second opening 148 being arranged longitudinally between the first opening 146 and the third opening 150. In the illustrated embodiment, a barrel 152 may be arranged generally concentrically with the third opening 150 and may extend from the rear wall 142 in a direction toward the actuation plate 104.

The sensor mounting bracket 132 may be engaged with the second side wall 140 longitudinally between the first opening 146 and the second opening 148. The sensor mounting bracket 132 may support the proximity sensor 112 within the cavity 110 formed by the body 102.

In the illustrated embodiment, the proximity sensor 112 may include a sensor surface 154 arranged at one end thereof. The proximity sensor 112 may output a signal from the sensor surface 154 (e.g., a magnetic signal, an inductive signal, an electromagnetic sensor, etc.) and the proximity sensor 112 may be configured to detect if the output signal emitted from the sensor surface 154 is blocked or unblocked. It is to be appreciated that a variety of styles of sensors could be used in place of or in addition to a proximity sensor, including one or more mechanical or electrical switches, such as snap-action, or pressure switches or strain gauges, as non-limiting examples.

In the illustrated embodiment, the actuation plate 104 may include a tab 156 coupled to the actuation plate 104 and that extends in a direction toward the body 102. In general, the tab 156 may be arranged on the actuation plate 104 so that the tab 156 eventually aligns with and covers the sensor surface 154 of the proximity sensor 112 during non-pivotal displacement of the actuation plate 104 toward the body 102. In the illustrated embodiment, the actuation plate 104 may include an angled portion 157 arranged an end thereof. The angled portion 157 may extend in a direction toward the body 102. In some embodiments, the angled portion 157 may facilitate non-pivotal displacement of the actuation plate 104 relative to the body 102 if a load is dropped onto the forks of an MHV from above (i.e., not slide along the forks).

The actuator 106 may include a cylinder 158 and a plunger 160 slidably received within the cylinder 158. The cylinder 158 may be received within and coupled to the second opening 148 of the body 102. The plunger 160 may be coupled to the actuation plate 104. The slidable movement governed by the plunger 160 received within the cylinder 158 may provide a non-pivotal coupling between the actuation plate 104 and the body 102. That is, the actuator 106 may be configured to movably couple the actuation plate 104 to the body 102 so that that actuation plate 104 is configured to non-pivotally displace relative to the body 102. The first spring assembly 107 and the second spring assembly 108 may be configured to provide stability and a biasing force against which an input force may non-pivotally displace the actuation plate 104 in a direction toward the body 102.

The first spring assembly 107 and the second spring assembly 108 may be arranged on opposing sides of the actuator 105. That is, the first spring assembly 107 may be coupled between the body 102 and the actuation plate 104 on one side of the actuator 106 and the second spring assembly 108 may be coupled between the body 102 and the actuation plate 104 on a longitudinally-opposing side of the actuator 106. Each of the first spring assembly 107 and the second spring assembly 108 may include a spring 162 and a shaft 164. Each of the springs 162 may be biased between the body 102 and the actuation plate 104 and may be configured to bias the actuation plate 104 in a direction away from the body 102.

In general, each of the shafts 164 may be slidably received within and arranged concentrically within the springs 162. The shaft 164 of the first spring assembly 107 may be coupled to the first opening 146 of the body 102. The shaft 164 of the first spring assembly 107 may be slidably received by one of the actuation plate 104 and the first opening 146 to enable the spring 162 of the first spring assembly 107 to compress during non-pivotal displacement of the actuation plate 104 in a direction toward the body 102. The shaft 164 of the second spring assembly 108 may be configured to be slidably received within the barrel 152 of the body 102 to compress the spring 162 of the second spring assembly 108 during non-pivotal displacement of the actuation plate 104 in a direction toward the body 102. In the illustrated embodiment, the shaft 164 of the second spring assembly 108 may extend partially toward but not into the barrel 152, when the actuation plate 104 is in an extended position (see FIG. 5). In some embodiments, the shaft 164 of the second spring assembly 108 may at least partially extend into and through the barrel 152, when the actuation plate 104 is in the extended position (see FIG. 21).

Figure 6:
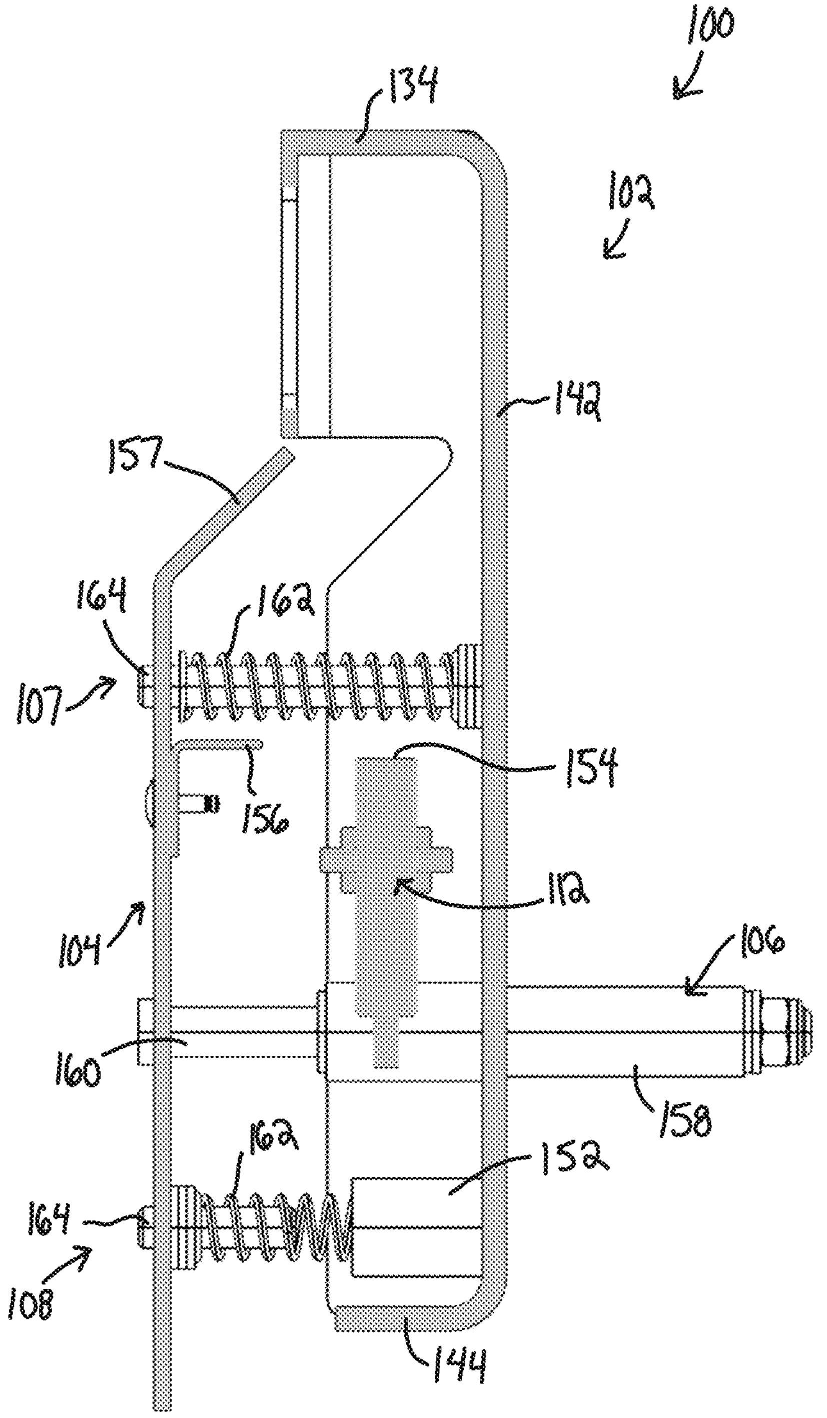
FIG. 6 is a cross-sectional view of the pallet detection assembly of FIG. 3 taken along line 6-6.
Figure 7:
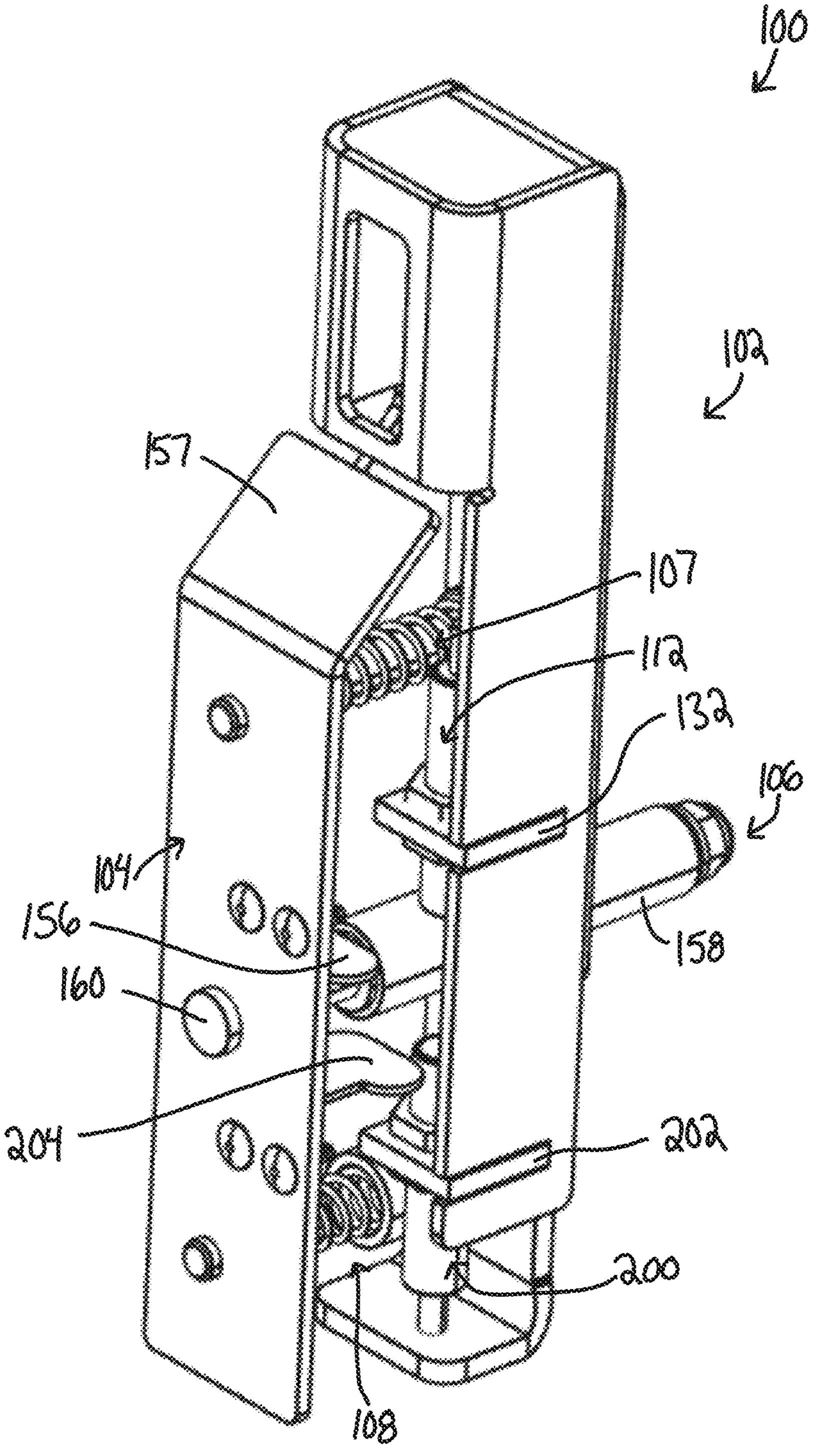
FIG. 7 is a top, front, left isometric view of another pallet detection assembly according to aspects of the present disclosure.
Figure 8:
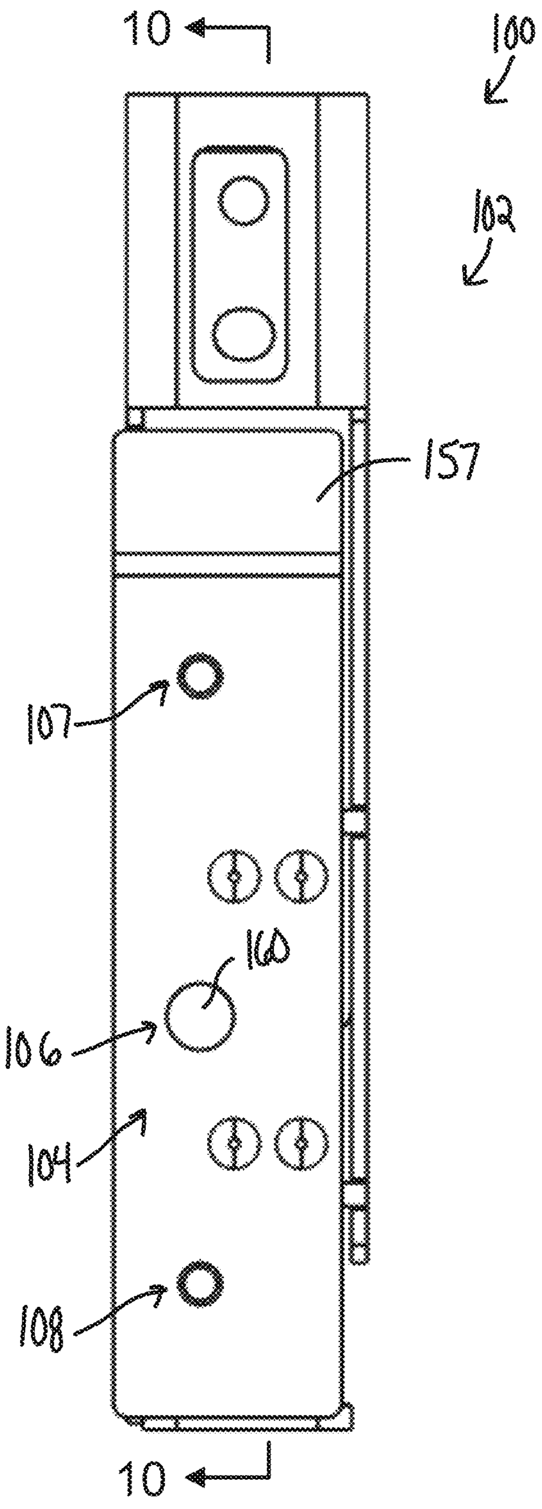
FIG. 8 is a front view of the pallet detection assembly of FIG. 7.
Figure 9:
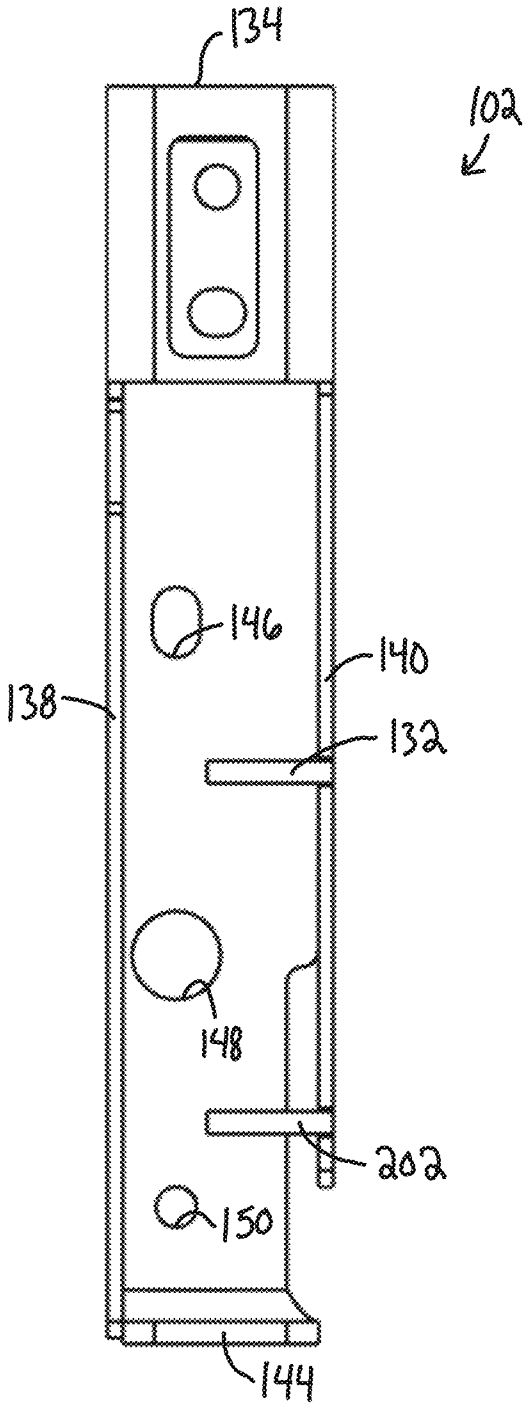
FIG. 9 is a front view of a body of the pallet detection assembly of FIG. 7.

With specific reference to FIG. 6, during operation, the pallet detection assembly 100 may be mounted to an MHV in a location to ensure that a pallet supported on forks of the MHV engages the actuation plate 104 when the pallet is properly seated and received fully onto the forks. Prior to the MHV engaging a load, or when a load is not fully received on the forks, the actuation plate 104 may be in an extended position (see FIG. 6). As the MHV receives a palletized load, the pallet may engage the actuation plate 104 and provide an input force thereto that overcomes the biasing force of the first spring assembly 107 and the second spring assembly 108, which results in the actuation plate 104 non-pivotally displacing toward the body 102. As the actuation plate 104 non-pivotally displaces toward the body 102, the tab 156 coupled to the actuation plate 104 may displace toward the sensor surface 154 of the proximity sensor 112. Once the tab 156 displaces an amount sufficient to at least partially cover the sensor surface 154, the proximity sensor 112 may transition from an unblocked state where the sensor surface 154 is unblocked by the tab 156 and a blocked position where the sensor surface 154 is at least partially blocked by the tab 156. In some embodiments, when the proximity sensor 112 transitions to the blocked state, the MHV may have fully received the palletized load on the forks.

With reference to FIGS. 7-10, in some embodiments, the pallet detection assembly 100 may include one or more proximity sensors 112. For example, as illustrated in FIGS. 7-10, the proximity sensor 112 may be a first proximity sensor 112 and the pallet detection assembly 100 may include a second proximity sensor 200 having a sensor surface 201. The body 102 may include a second sensor mounting bracket 202 engaged with the second side wall 140 longitudinally between the second opening 148 and the third opening 150. The second sensor mounting bracket 202 may support the second proximity sensor 200 within the cavity 110 formed by the body 102. In general, the first proximity sensor 112 and the second proximity sensor 200 may be axially aligned with and axially separated from one another.

Figure 10:
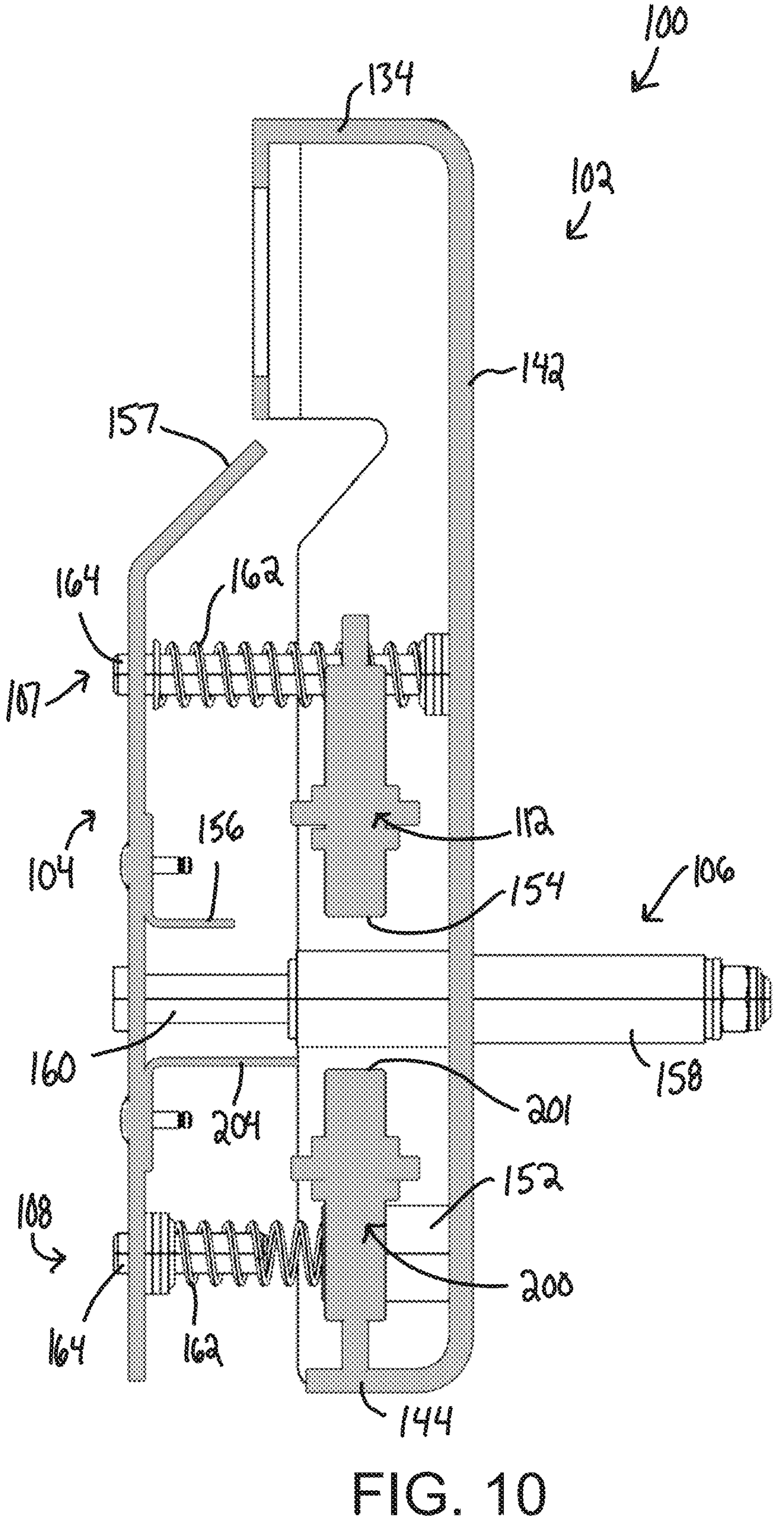
FIG. 10 is a cross-sectional view of the pallet detection assembly of FIG. 8 taken along line 10-10.

With specific reference to FIG. 10, the body 102 may include a second tab 204 that is coupled to the actuation plate 104 and extends toward the body 102. The second tab 204 may extend from the actuation plate 104 toward the body 102 a different distance than the tab 156. In the illustrated embodiment, the second tab 204 may extend a further distance toward the body 102 than the tab 156. In this way, for example, the pallet detection assembly 100 of FIGS. 7-10 may define two pallet detection states. That is, when the second proximity sensor 200 transitions to the blocked state after the actuation plate 104 is displaced by an input force by a first distance d1, the MHV may be supporting a load on the forks but the load may not yet be fully received on the forks. If the actuation plate 104 is displaced further to a distance d2 where the first proximity sensor 112 transitions to the blocked state, the MHV may have fully received the load on the forks.

Figure 11:
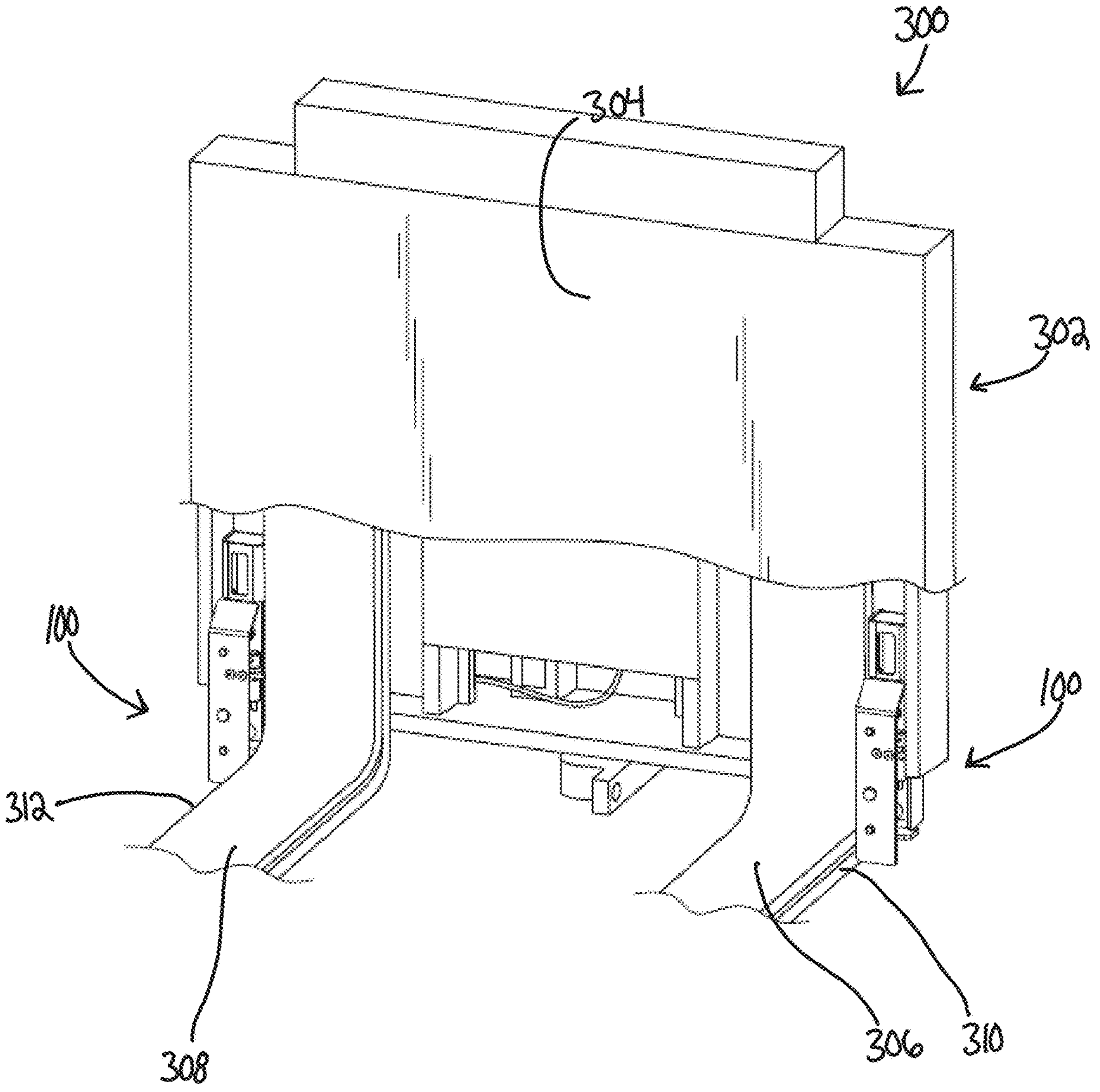
FIG. 11 is a partial top, front, left isometric view of a material handling vehicle including a pallet detection assembly according to the present disclosure.
Figure 12:
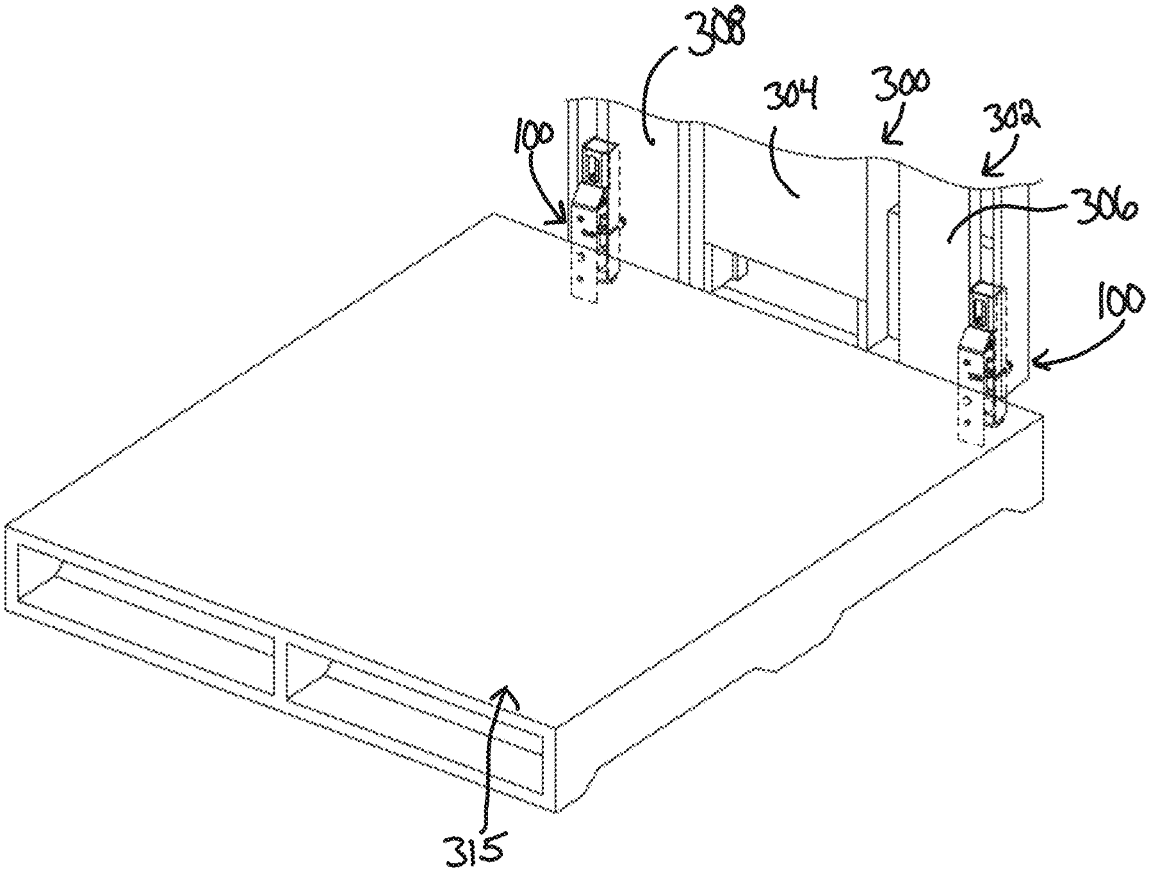
FIG. 12 is a partial top, front, left isometric view of the material handling vehicle of FIG. 11 with a pallet being supported on a pair of forks.
Figure 13:
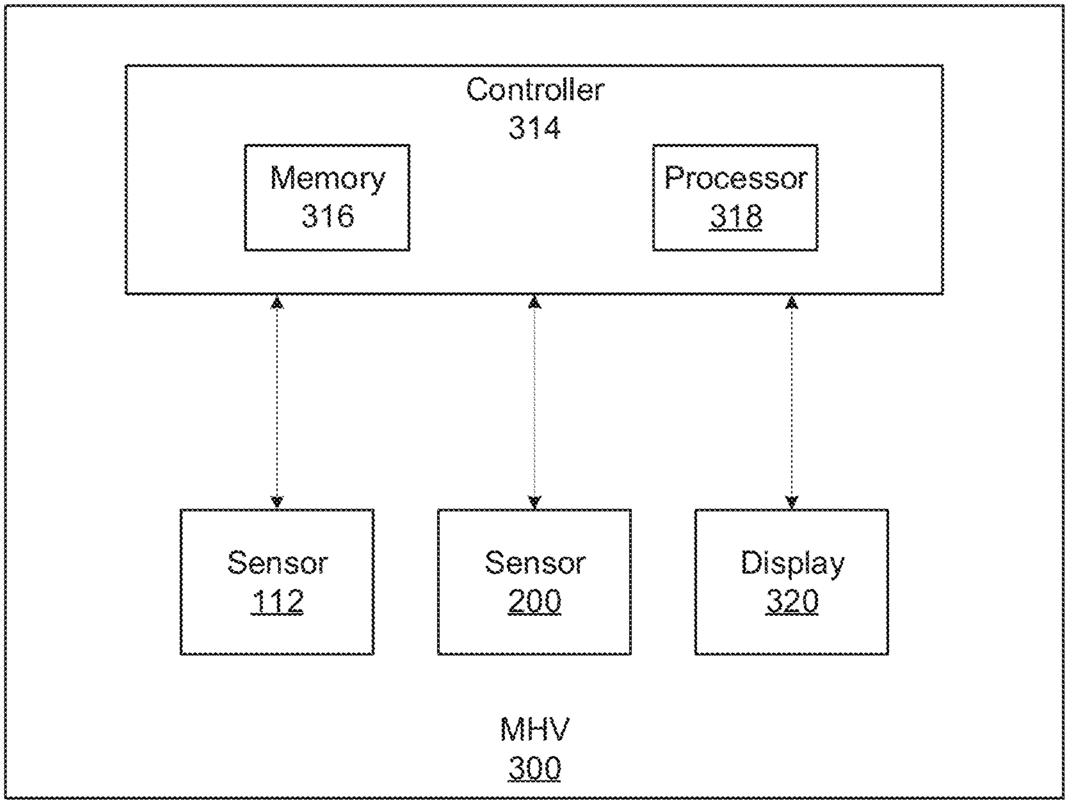
FIG. 13 is a schematic illustration of the material handling vehicle of FIG. 11.

As described herein, the pallet detection assembly 100 may be installed on an MHV. Turning to FIGS. 11-13, an MHV 300 may include one or more pallet detection assemblies 100 coupled to a fork carriage 302. The fork carriage 302 may include a fork backrest 304, a first fork 306, and a second fork 308 each coupled to the fork carriage 302, and a pair the pallet detection assemblies 100. In the illustrated embodiment, the MHV 300 may include a one of the pallet detection assemblies 100 coupled to the fork carriage 302 adjacent to a laterally-outer edge 310 of the first fork 306 and another of the pallet detection assemblies 100 coupled to the fork carriage 302 arranged adjacent to a laterally-outer edge 312 of the second fork 308.

In some embodiments, the MHV 300 may include a controller 314 having memory 316 and a processor 318. The controller 314 may be in communication with the first proximity sensor 112 and, in some embodiments, the second proximity sensor 200. In some embodiments, the controller 314 may be in communication with a display 320.

In general, the arrangement of two or more of the pallet detection assemblies 100 on the fork carriage 302 may enable the detection of whether a load 315 is received on the first fork 306 and the second fork 308 and whether or not the load is askew. For example, FIG. 14 illustrates potential outputs of the proximity sensors 112 on both of the pallet detection assemblies 100 of the MHV 300 in the configuration of the pallet detection assemblies 100 that include one proximity sensor 112. When both of the proximity sensors 112 are unblocked, the controller 314 may provide an indication, for example, to the display 320, a warehouse management system (WMS) in communication with the controller 314, or another external controller that a load is not received on the forks. If the only one of the pallet detection assemblies 100 is in the blocked state and the other is in the unblocked state, the controller may provide an indication that a load is arranged askew on the forks. If both of the pallet detection assemblies 100 are in the blocked state, then the controller 314 may provide an indication that the load is fully received on the forks and properly aligned.

As described herein, in some embodiments, the pallet detection assembly 100 may include a first proximity sensor 112 and a second proximity sensor 200. FIG. 15 illustrates potential outputs of the first proximity sensor 112 and the second proximity sensor 200 on both of the pallet detection assemblies 100 of the MHV 300. That is, the MHV 300 may include a first pallet detection assembly and a second pallet detection assembly that both include a first proximity sensor 112 and a second proximity sensor 200. When all of the proximity sensors are unblocked, the controller 314 may provide an indication that a load is not received on the forks. When one of the second proximity sensors 200 is in the blocked state and one of the second proximity sensor 200 is in the unblocked state (both of the first proximity sensors 112 are unblocked), the controller 214 may provide an indication that a load is arranged askew on the forks. When both of the second proximity sensors 200 are in the blocked state and both of the first proximity sensors 112 are in the unblocked state, the controller 214 may provide an indication that a load is centered but not fully received on the forks. When both of the second proximity sensors 200 are in the blocked state, one of the first proximity sensors 112 is in the blocked state, and one of the first proximity sensors 112 is in the unblocked state, the controller may provide an indication that a load is received on the forks but askew. When both of the second proximity sensors 200 and both of the first proximity sensors 112 are in the blocked state, the controller 314 may provide an indication that a load is fully received on the forks and properly aligned.

Figure 16:
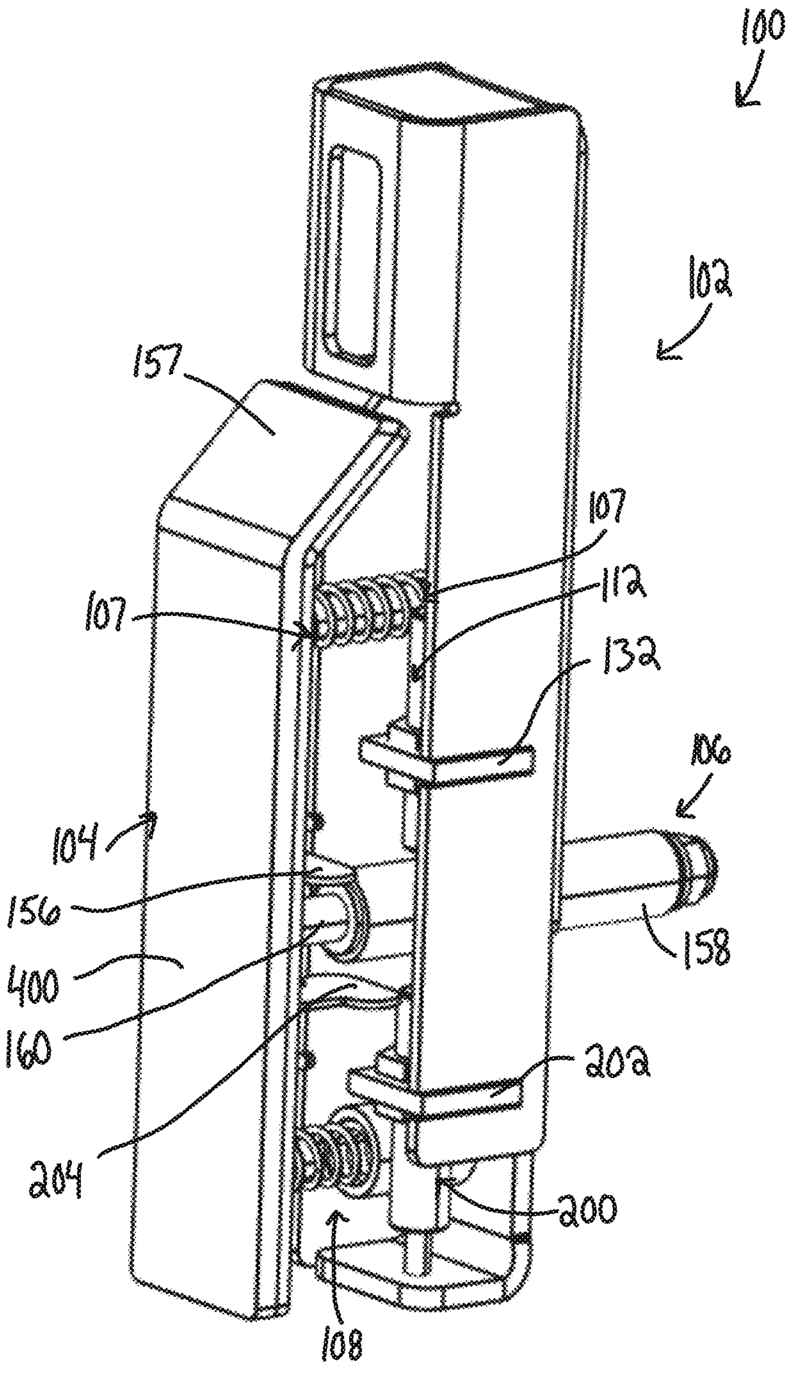
FIG. 16 is a top, front, left isometric view of another pallet detection assembly according to aspects of the present disclosure.

In some embodiments, the pallet detection assembly 100 may be designed to include alternative shapes and configurations of the actuation plate 104. For example, FIG. 16 illustrates an embodiment of the pallet detection assembly 100 that includes a spacer plate 400 coupled to an outer surface of the actuation plate 104. The spacer plate 400 may provide a smooth surface against which a pallet or load may provide an input force to non-pivotally displace the actuation plate 104 relative to the body 102.

Figure 17:
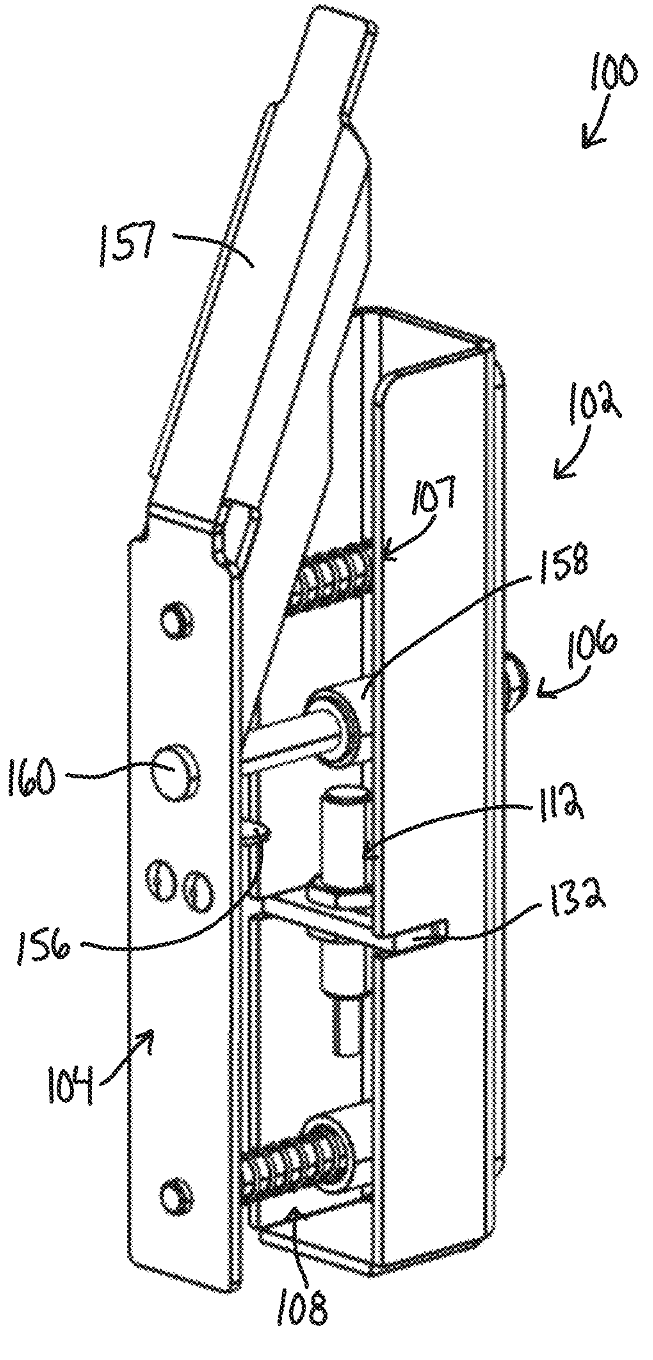
FIG. 17 is a top, front, left isometric view of another pallet detection assembly according to aspects of the present disclosure.
Figure 18:
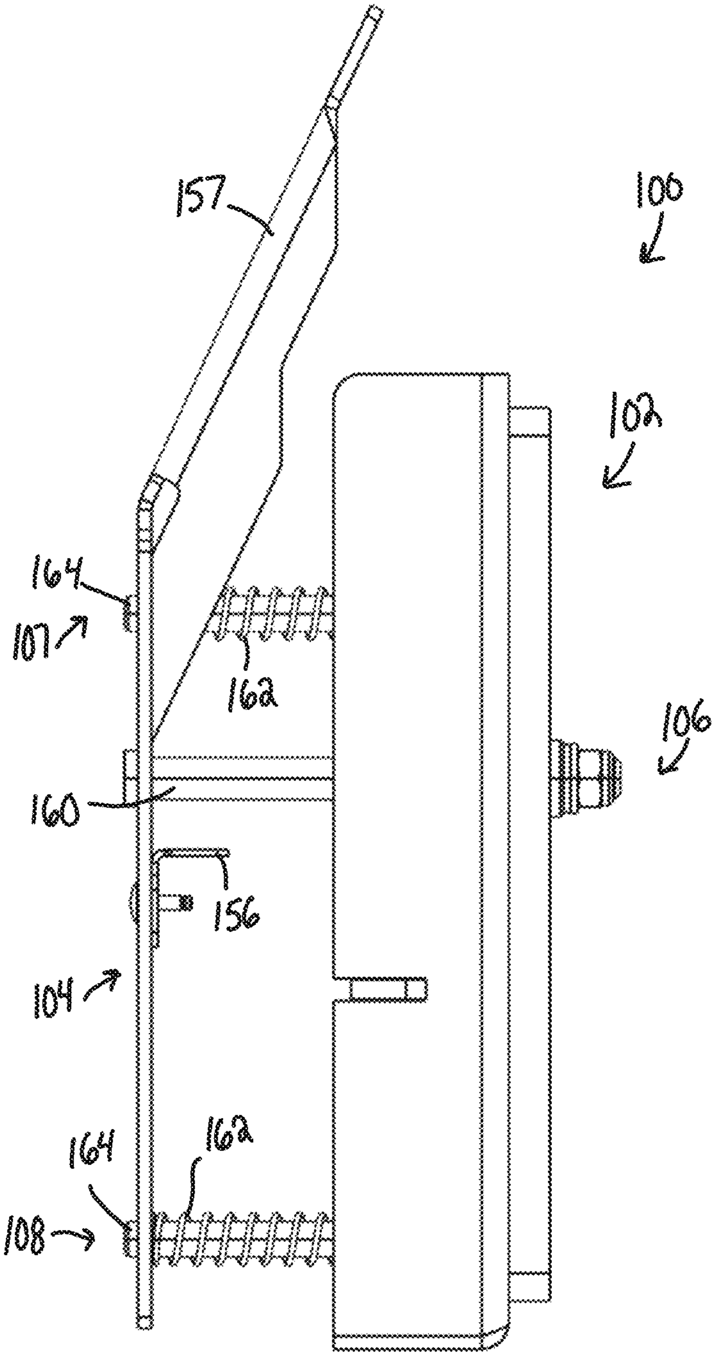
FIG. 18 is a left side view of the pallet detection assembly of FIG. 17.

FIGS. 17-18 illustrated an embodiment of the pallet detection assembly 100 where the angled portion 157 extends vertically beyond a first end 402 of the body 102 (e.g., a top end from the perspective of FIGS. 17 and 18. In this way, for example, the angled portion 157 may further aid in non-pivotally displacing the actuation plate 104 relative to the body 102 when a load is vertically placed on the forks of the MHV 300.

Figure 19:
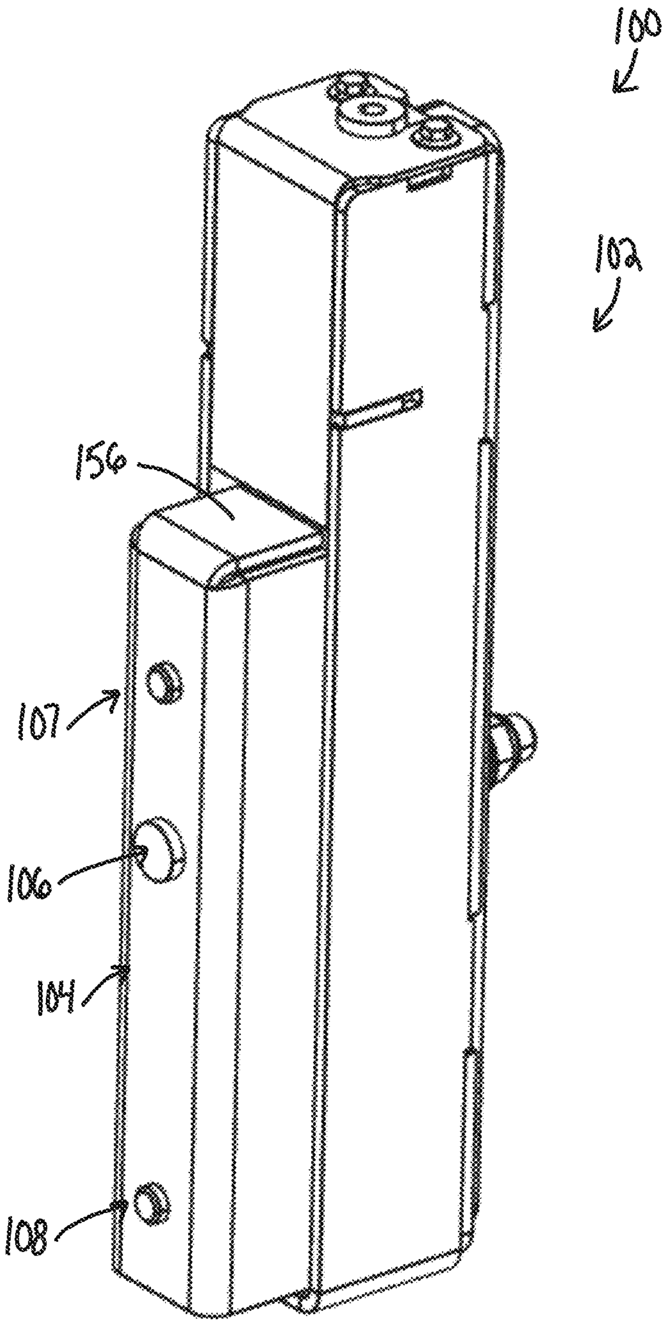
FIG. 19 is a top, front, left isometric view of another pallet detection assembly according to aspects of the present disclosure.
Figure 20:
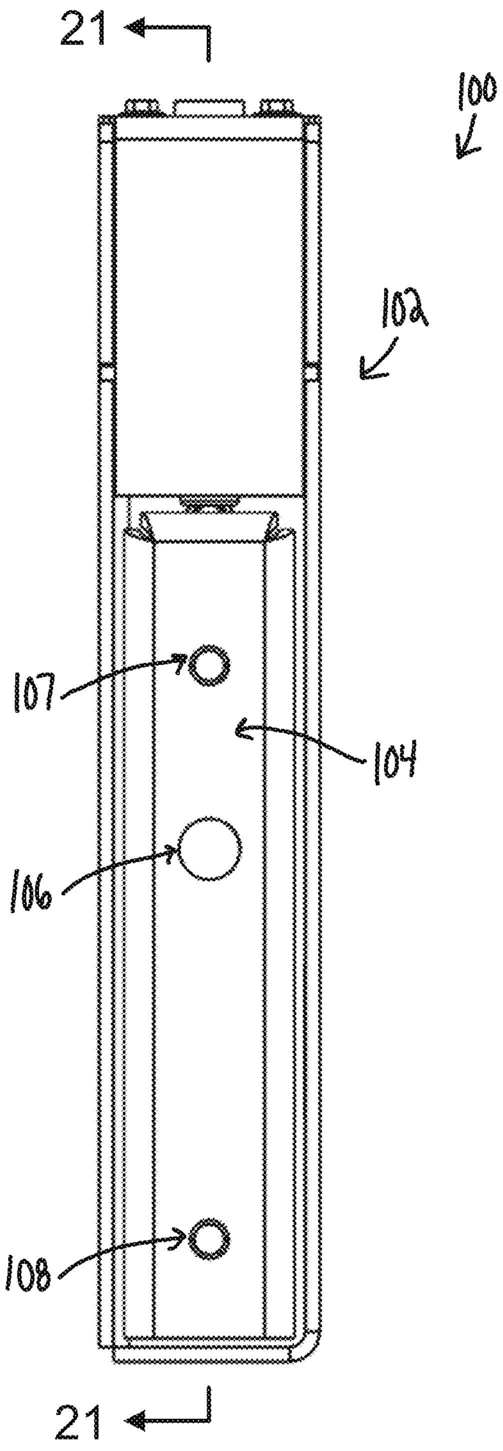
FIG. 20 is a front view of the pallet detection assembly of FIG. 19.
Figure 21:
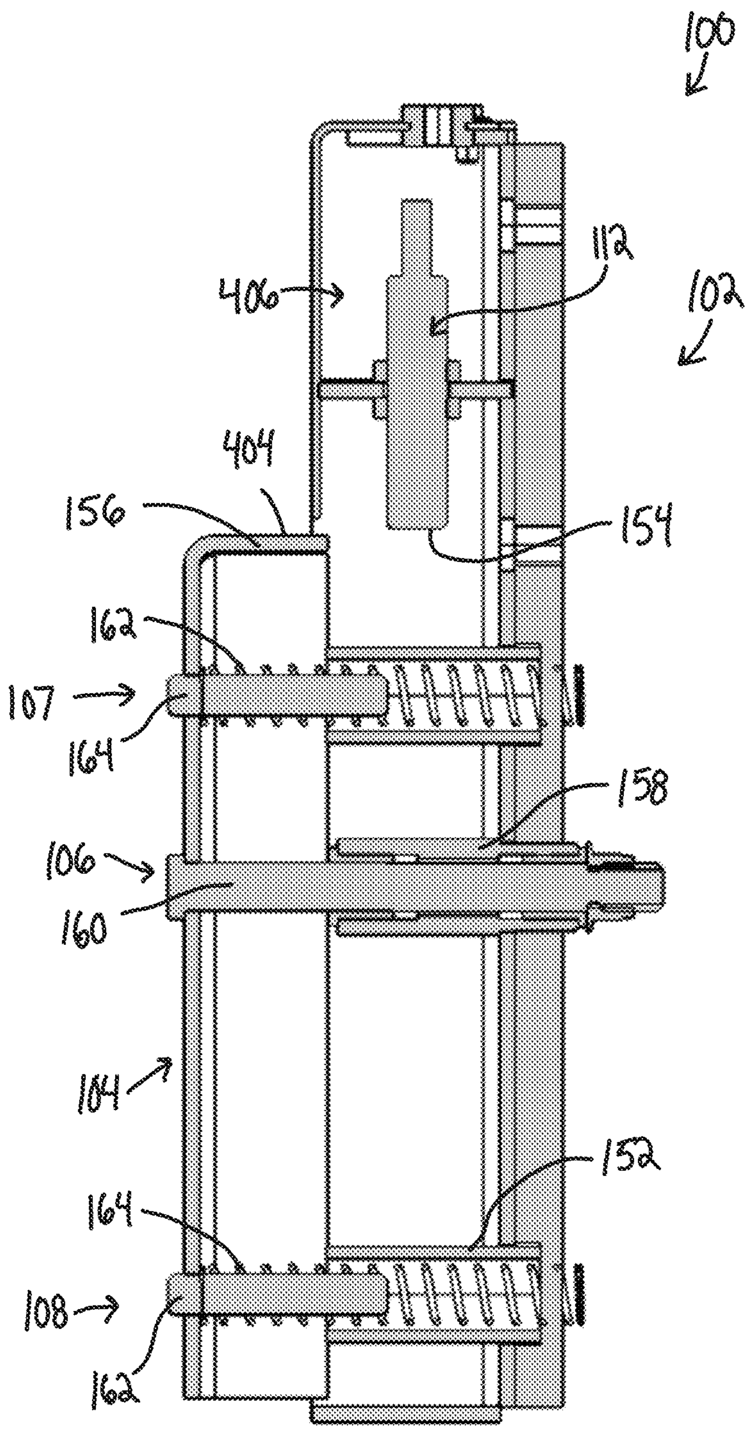
FIG. 21 is a cross-sectional view of the pallet detection assembly of FIG. 20 taken along line 20-20.

FIGS. 19-21 illustrated an embodiment of the pallet detection assembly 100 where the tab 156 is integrated into the actuation plate 104 (e.g., integrally formed as a unitary component). In the illustrated embodiment, the actuation plate 104 may not include an angled portion. In the illustrated embodiment, the tab 156 is formed by a top surface 404 of the actuation plate 104. In the illustrated embodiment, the proximity sensor 112 is moved (compared to the embodiment of FIGS. 1-6) within the cavity 110 to a top portion 406 of the cavity 110. In this way, for example, as the actuation plate 104 is non-pivotally displaced toward the body 102, the top surface 404 may eventually be displaced into a position where it blocks the sensor surface 154 of the proximity sensor 112.

While various spatial and directional terms, such as top, bottom, lower, mid, lateral, horizontal, vertical, front, and the like may be used to describe examples of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

We claim:

1. A method of load detection for a material handling vehicle, the method comprising:

receiving a load on a fork carriage of the material handling vehicle, the fork carriage including a first fork and a second fork laterally separated from the first fork;

actuating one or more actuation plates of two or more load detection assemblies mounted to the material handling vehicle, via the load, from a first, extended, position to a second, compressed, position; and, determining whether the load on the fork carriage is properly aligned based on the position of the actuation plates of the load detection assemblies;

wherein the position of the actuation plates corresponds to a status of a proximity sensor within each of the two or more load detection assemblies; and wherein the status of the proximity sensor includes an unblocked state and a blocked state.

2. The method of claim 1, wherein the load detection assembly has a body defining a cavity, and wherein the body includes the proximity sensor housed at least partially within the cavity.

3. The method of claim 2, wherein the actuation plate includes a tab coupled to the actuation plate, and wherein the tab extends from the actuation plate in a direction toward the body.

4. The method of claim 3, further comprising:

coupling the actuation plate to the body via an actuator, wherein the actuator includes a cylinder coupled to the body and a plunger slidably received within the cylinder and coupled to the actuation plate; and displacing the actuation plate relative to the body via non-pivotal movement of the actuation plate.

5. The method of claim 4, wherein determining whether the load on the fork carriage is properly aligned includes:

monitoring a status of the proximity sensor; and determining proper alignment of the load based on the status of the proximity sensor;

wherein, in the unblocked state, the proximity sensor is unblocked by the tab, and wherein, in the blocked state, the proximity sensor is at least partially blocked by the tab.

6. The method of claim 5, wherein the load detection assemblies include a first load detection assembly, including a first proximity sensor, arranged adjacent to a laterally-outer edge of the first fork and a second load detection assembly, including a second proximity sensor, arranged adjacent to a laterally-outer edge of the second fork.

7. The method of claim 6, further comprising:

determining that the load is not properly loaded on the fork carriage when both the first proximity sensor and the second proximity sensor are in the unblocked state.

8. The method of claim 6, further comprising:

determining that the load is properly loaded on the fork carriage when both the first proximity sensor and the second proximity sensor are in the blocked state.

9. The method of claim 6, further comprising:

determining that the load is askew on the fork carriage when one of the first proximity sensor or the second proximity sensor is in the blocked state and the other of the first proximity sensor or the second proximity sensor is in the unblocked state.

10. The method of claim 4, further comprising:

biasing the actuation plate in a direction away from the body via one or more spring assemblies, wherein the spring assemblies are arranged on opposing sides of the actuator, and wherein each of the spring assemblies are coupled between the body and the actuation plate.

11. A method of load detection for a material handling vehicle, the method comprising:

monitoring, via a controller, a status of two or more load detection assemblies mounted to the material handling vehicle;

actuating one or more actuation plates of the load detection assemblies mounted to the material handling vehicle, via the load, from a first position to a second position; and, determining whether the load is properly aligned based on the position of the actuation plates of the load detection assemblies;

wherein each load detection assembly includes a body defining a cavity and at least one proximity sensor housed at least partially within the cavity;

wherein each actuation plate includes at least one tab coupled to the actuation plate and extending toward the body; and wherein, in the first position, the proximity sensor is unblocked by the tab, wherein, in the second position, the proximity sensor is at least partially blocked by the tab, and wherein the status of the load detection assemblies is determined based on the status of the proximity sensor.

12. The method of claim 11, further comprising:

coupling the actuation plate to the body via an actuator, wherein the actuator includes a cylinder coupled to the body and a plunger slidably received within the cylinder and coupled to the actuation plate; and, displacing the actuation plate relative to the body via non-pivotal movement of the actuation plate.

13. The method of claim 12, further comprising:

biasing the actuation plate in a direction away from the body via one or more spring assemblies, wherein the spring assemblies are arranged on opposing sides of the actuator, and wherein each of the spring assemblies are coupled between the body and the actuation plate.

14. The method of claim 11, wherein the material handling vehicle includes a fork carriage, and wherein the fork carriage includes a first fork and a second fork laterally separated from the first fork.

15. The method of claim 14, wherein the load detection assemblies include a first load detection assembly, with a first proximity sensor, arranged adjacent to a laterally-outer edge of the first fork and a second load detection assembly, with a second proximity sensor, arranged adjacent to a laterally-outer edge of the second fork.

16. The method of claim 15, further comprising:

determining that the load is not properly loaded on the fork carriage when both the first proximity sensor and the second proximity sensor are unblocked.

17. The method of claim 15, further comprising:

determining that the load is properly loaded on the fork carriage when both the first proximity sensor and the second proximity sensor are blocked.

18. The method of claim 15, further comprising:

determining that the load is askew on the fork carriage when one of the first proximity sensor or the second proximity sensor is blocked and the other of the first proximity sensor or the second proximity sensor is unblocked.

19. A method of load detection for a material handling vehicle, the method comprising:

monitoring, via a controller, a status of one or more proximity sensors at least partially held within a body of two or more load detection assemblies mounted to the material handling vehicle;

actuating one or more actuation plates of the load detection assemblies mounted to the material handling vehicle via the load, wherein the actuation plates include one or more tabs coupled to the actuation plate and extending towards the body of the load detection assembly;

displacing the actuation plate relative to the body via non-pivotal displacement of the actuation plate to transition the proximity sensor between an unblocked state, where the proximity sensor is unblocked by the tab and a blocked state where the sensor is at least partially blocked by the tab; and, determining whether the load is properly aligned based on the status of the one or more proximity sensors.

20. The method of claim 19, further comprising:

displacing the actuation plate relative to the body via non-pivotal displacement of the actuation plate to transition a second proximity sensor between an unblocked state where the second proximity sensor is unblocked by a second tab and a blocked state where the second proximity sensor is at least partially blocked by the second tab;

indicating an unloaded state of the material handling vehicle when both proximity sensors are in an unblocked state;

indicating a partially loaded state when only one of the proximity sensors is in a blocked state; and indicating a loaded state when both proximity sensors are in a blocked state;

wherein the second proximity sensor is housed at least partially within the body, and wherein the second tab is coupled to the actuation plate and extends toward the body.

* * * * *